United States Patent [19]

Sims

[11] Patent Number: 4,461,215
[45] Date of Patent: Jul. 24, 1984

[54] TRANSPORTING SYSTEM FOR ROBOT

[75] Inventor: Terence B. H. Sims, Detroit, Mich.

[73] Assignee: Superior Robotic Transporters, Inc., Livonia, Mich.

[21] Appl. No.: 394,978

[22] Filed: Jul. 2, 1982

[51] Int. Cl.³ .............................................. B61K 7/00
[52] U.S. Cl. ................... 104/1 R; 188/43; 198/345; 414/750
[58] Field of Search ............... 104/1 R, 212, 218, 222, 104/242, 248, 250, 249, 166, 258; 105/164, 199 A, 29 R, 163 R; 188/43, 38.5; 198/345; 414/749, 750, 751

[56] References Cited

U.S. PATENT DOCUMENTS

| | | | |
|---|---|---|---|
| 1,279,662 | 9/1918 | Crawford | 104/248 |
| 3,221,668 | 12/1965 | Munck | 104/287 |
| 3,687,239 | 8/1972 | Moehlenpah et al. | 188/43 |
| 3,807,532 | 4/1974 | Molt | 188/43 |
| 4,188,887 | 2/1980 | Dewing et al. | 105/163 R |

FOREIGN PATENT DOCUMENTS 1243363 6/1967 Fed. Rep. of Germany ...... 105/164

Primary Examiner—R. B. Reeves
Assistant Examiner—Donald Hajec
Attorney, Agent, or Firm—Cullen, Sloman, Cantor, Grauer, Scott & Rutherford

[57] ABSTRACT

A transporting system for a robot comprises a self-propelled wheeled platform which travels along a pair of tracks which establish a path between a series of spaced work stations. Accurate positioning of the platform at the work stations is achieved by a toggle-operated platform-mounted mechanism which lifts the platform above the track, using four precisely positioned locator blocks fixed to the tracks at each work station. These blocks provide a reaction and reference surface for the lifting mechanism and have formations which cooperate with formations on the carriage to cam the carriage into the desired longitudinal and transverse position as the carriage is lifted. The lifting mechanism also functions to fixedly clamp the carriage to the locator blocks once the final position has been achieved. Alternative embodiments permit precise elevational and lateral positioning at predetermined elongated positions along the track, while loosely gripping the elongated locator blocks, thereby permitting the robot to perform operations as it moves along the track, while still being precisely positioned and stabilized against overturning tendencies.

4 Claims, 8 Drawing Figures

TRANSPORTING SYSTEM FOR ROBOT

BACKGROUND OF THE INVENTION

In robot applications where the robot is required to move between multiple work stations to perform operations on large stationary objects, such as an airplane wing, the provision of durable and reliable transporting systems capable of consistently and accurately positioning the robot at each successive work station has proven to be a challenging problem. Typically, some form of hardened boxway slide or tracking is utilized for guiding and transporting the robot. To achieve the desired accuracy and durability, prior art systems have proven to be very costly. For example, ball and roller systems and boxway systems require constant and thorough lubrication. Long travel distances, high speeds and heavy loads combine to create severe environmental problems, these problems being further compounded by the deleterious effect of dirt, paint, welding spatter and so forth which is often present and which tends to accelerate wear and increase friction in the driving system.

The accuracy of conventionally transported and driven robot systems generally depends upon the accuracy of the entire track installation. Long travel distances therefore require a very expensive foundation and installation procedure, and regular realignment is required even with the best of foundations, usually with a laser.

The provision of means for driving slideways over long distances also creates problems. Cylinders or ball screws are not practical, and the usual solution is the use of a rack and pinion. If the robot-supporting saddle and its load are heavy, a heavy rack is required. Such a rack has to be aligned to the base of the slideway with virtually the same degree of accuracy as is required for the ways. For high transport speeds, a coarse pitch is generally required, which in turn necessitates heavy bearings on the pinion to prevent the pinion from climbing out of the rack. If the pinion axle is vertical, then saddle space is consumed by the motor unit, requiring a longer saddle and greater wasted travel at one end of the ways. The rack also must be protected from dirt, and often consume valuable space between the way rails.

Heretofore, the use of wheels and tires was generally not practical, because of the required accuracy of the tracking and because the carriage would rock on its tires when the robot arm was extended laterally across the tracks when the robot was in operation, introducing unreliable positioning of the robot. Such overhung loads on the robot arms also presented a safety problem.

Accordingly, it is the principal object of the present invention to provide an improved transporter system for robots which provides consistent accuracy of robot location at multiple work stations without the requirement of costly foundation systems and periodic realignment, and which is capable of rapid travel without lubrication and wear problems.

SUMMARY OF THE INVENTION

The foregoing objects are accomplished by the provision of a simple track system along which is guided a urethane-wheeled robot-supporting carriage. The carriage is self-propelled by means of the power-driven wheels. Accuracy of robot-positioning at the work stations is achieved by a toggle-operated lifting and clamping mechanism which lifts the carriage wheels from the track at such work stations and which accurately positions and clamps the carriage relative to precisely positioned locating blocks at each work station. Essentially the same mechanism permits the carriage to precisely position the robot in the elevational and lateral directions and to stabilize it against overturning tendencies while the carriage is moving through predetermined elongated segments of the track, as where the robot performs its desired operations while traveling along the track. In this manner, the accuracy of the entire length of the track is no longer required, but rather only the position of the readily installed locator blocks at each work station need be controlled. Deflection and safety problems resulting from overhung loads are eliminated by securely clamping all four corners of the carriage to such locator blocks during the work cycle. The use of simple urethane wheels eliminates the need for complex lubrication systems along the length of the track system, and wear effects on the wheels becomes irrelevant because the position of the carriage at the work stations is completely independent of the position of the track and wheels.

The track is available in modular lengths, such as ten-foot lengths, and any length of track system is obtainable by a simple coupling of such modules. The track can be laid on any floor that will accept anchor bolts, without the need for special alignment or leveling or maintenance. The track can be protected from dirt by simple fixed shields.

Multiple wheel drives permit high speeds and rapid acceleration and deceleration, yet only minimal maintenance is required.

These and other objects and advantages of the present invention will become apparent from the following specification.

DETAILED DESCRIPTION OF THE INVENTION

Figure 1:
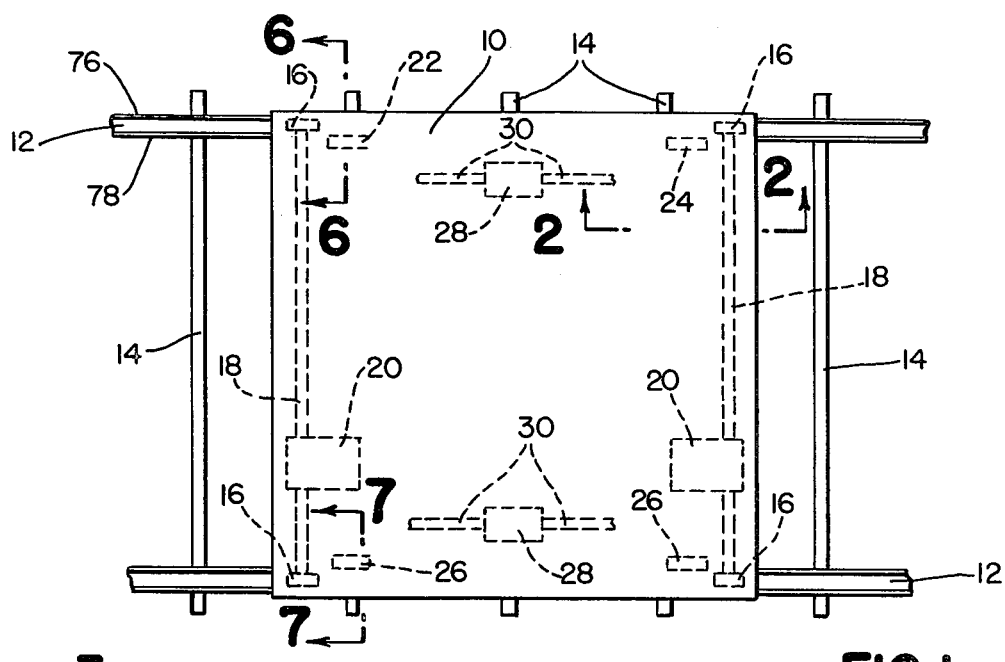
FIG. 1 is a simplified plan view of the carriage of the present invention and a portion of the supporting track system at a single work station.

Referring to FIG. 1 of the drawings, the robot transporter system of the present invention generally comprises a carriage platform 10 which is caused to traverse a path defined by a pair of laterally spaced tracks 12 which are maintained in their proper relationship by channel-shaped cross ties 14. The platform 10 is supported on four drive wheels 16 which are each driven through axles 18 and a pair of hydraulic motors 20 mounted on the underside of the carriage.

By way of example, platform 10 may be approximately 60 inches square and wheels 16 may be six inch diameter steel wheels with urethane tires. As will be understood by those skilled in the art, appropriate bearings for rotatably supporting axles 18 to the underside of platform 10 would be provided, but, for simplicity, these are omitted from the drawings.

The locating means for assuring precise location of the transporter at predetermined work stations along the tracks generally comprises a series of four fixed hardened steel locator blocks at each work station. For this purpose, one side of the track system is considered the positive side (i.e., the upper track in the plan view of FIG. 1) while the other track (i.e., the lower track in FIG. 1) is considered the slave side. Along the positive side there is provided a positive locator block 22, which establishes both transverse and longitudinal positioning of the platform, and lateral locator block 24, which establishes only the lateral location of the carriage. As will be appreciated more fully after a detailed explanation of these elements, it is desirable that there be only one longitudinal position-controlling element, to avoid problems with tolerances and the need for excessive precision in the relative placement of multiple locators. Similarly, it is only necessary to establish lateral positioning of one longitudinal side of the carriage. The opposite side of the carriage, i.e., the slave side, has two slave locator blocks 26. All of the locator blocks contribute to the precise elevational positioning of the carriage at the work stations.

Thus, each work station along the track system is provided with these four locator blocks which cooperate with structure on the underside of the carriage to accurately position the carriage at such station, as will be described below.

As will be understood by those skilled in the art, a first set of limit switches near each work station will signal the carriage drive motor to decelerate to a creep speed for a final half inch or so until a second limit switch shuts off the drive motor at the final location, preferably within one-sixteenth of an inch of the precise desired longitudinal position.

Figure 2:
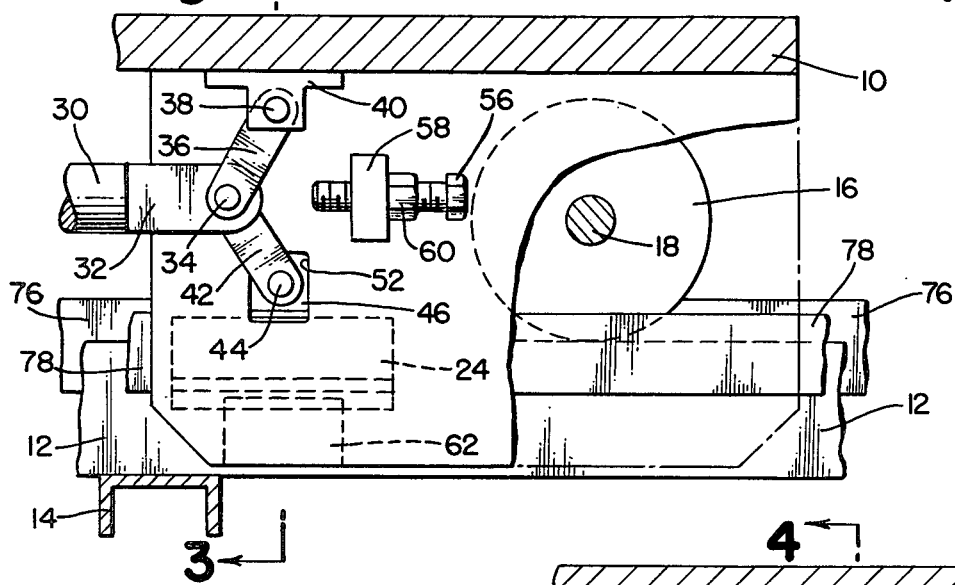
FIG. 2 is a fragmentary side elevation, partly in section, of a portion of the carriage and track system, viewed in the direction of arrows 2—2 of FIG. 1.
Figure 3:
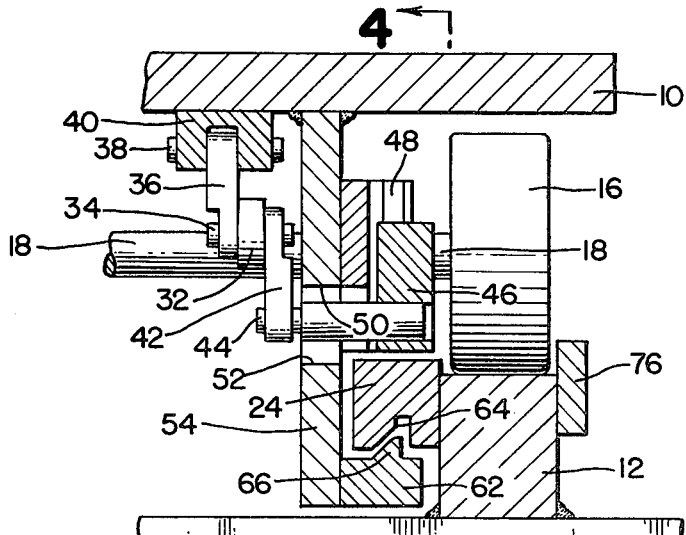
FIG. 3 is a fragmentary longitudinal sectional view in the direction of arrows 3—3 df FIG. 2.

The cylinder-operated toggle mechanism for lifting the carriage and clamping it at each of the work stations will now be described. Referring now to FIGS. 1—3, the carriage has a pair of identical hydraulic cylinders 28 mounted on its underside, each of which are double acting to simultaneously extend or retract a pair of oppositely directed cylinder rods 30. An appropriate hydraulic pump and motor may be mounted on the carriage, with the electrical power supply being located between the tracks. Alternatively, it will probably be preferred to mount the pump and motor on a separate tractor unit, mounted on the tracks immediately in front of or behind carriage 10 and connected thereto for pulling or pushing thereof. That is, the tractor would have power-driven wheels, while carriage 10 would not. Once in position at a work station, only carriage 10 need be lifted, the driving connection between the carriage and tractor permitting such change in their relative elevations. In such arrangement, the substantial weight of the pump and motor need not be added to the load to be lifted with carriage 10 and the robot mounted thereon.

Figure 4:
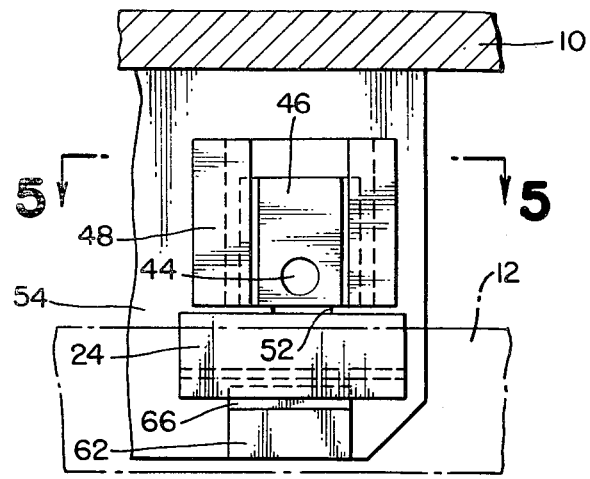
FIG. 4 is a fragmentary side elevational view, partly in section, viewed in the direction of arrows 4—4 of FIG. 3.
Figure 5:
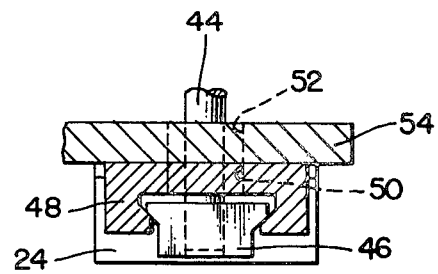
FIG. 5 is a fragmentary plan view in section, viewed in the direction of arrows 5—5 of FIG. 4.

The outer end of each cylinder rod has a connector 32 provided with a horizontal transverse pivot pin 34 to which is privotally connected a pair of toggle links. Upper toggle link 36 is pivotally mounted at its opposite end by means of pin 38 to a fixed bracket 40 on the underside of carriage platform 10, while lower toggle link 42 is pivotally mounted at its opposite end through pin 44 to pinch or lifting block 46. As best shown in FIGS. 3, 4 and 5, pinch block 46 is mounted for vertical sliding movement in dovetail guide block 48 under the impetus of toggle-actuated pin 44 which passes through clearance slot 50 in guide block 48 and clearance hole 52 in mounting plate 54. Dovetail guide block 48 is rigidly secured to mounting plate 54 which in turn is secured to the underside of platform 10.

Cylinder rod 30 is illustrated in its retracted position in FIG. 2, i.e., the position in which the carriage wheels 16 are resting on tracks 12. The outward stroke of cylinder rods 30 is limited by an adjustable stop mechanism in the form of screw 56 which is threaded into block 58 fixed to mounting plate 54. Locking nut 60 locks stop screw 56 in its pre-set condition. The left end of screw 56 is positioned in the path of rod connector 32 to be abutted thereby at the predetermined terminal point for the stroke of rod 30.

As will be understood by reference to FIGS. 2-5, actuation of hydraulic cylinders 28 to extend rods 30 causes the toggle mechanism shown in FIG. 2 to move toward the right from its illustrated retracted position. Because upper link 36 is pivotally mounted to carriage platform 10 at pivot pin 38, the initial stroke of rod 30 will cause no upward movement of the heavy carriage structure. Instead, movement of rod 30 to the right will cause pinch block 46 to slide downwardly in guide block 48 as a result of the downward movement of lower toggle link 42 and pivot pin 44. This downward movement will continue until the bottom face of pinch block 46 engages the upper face of locator block 24 which is precisely positioned at a predetermined lateral and elevational location on track 12, to which it is bolted. Such precise positioning may be established by appropriate slots for mounting bolts, in conjunction with shims, as will be understood by those skilled in the art.

The elements of the toggle mechanism are dimensioned so that such engagement of pinch block 46 with locator block 24 occurs prior to the attainment of top dead center position of the toggle mechanism. Therefore, continued outward stroking of cylinder rod 30 causes upper link 36 to lift carriage 10 upwardly until pivot pins 34, 38 and 44 are in vertical alignment at their top dead center position. This upward movement of the carriage lifts wheels 16 off track 12. Preferably, adjustable stop screw 56 is prepositioned to arrest outward movement of rod 30 when the toggle mechanism has slightly passed its top dead center position. For example, adjustment screw 56 may be positioned so that upper toggle link 36 rotates about five degrees past the top dead center position. As will be understood by those skilled in the art, this "over-center" position assures that, in the event of a hydraulic power failure, carriage 10 will remain in its elevated and precisely located position. As will be further appreciated following the explanation of the carriage clamping mechanism, this over-center condition also assures that the carriage will remain clamped at its work station, thereby precluding any danger of instability or overturning of the carriage from unbalanced loads in the event of a power failure or hydraulic leak.

It will be appreciated from the foregoing description that the elevation of the carriage at the predetermined work stations is establish by the elevation of the bottom surface of locator blocks 22, 24 and 26, rather than by the elevation of track 12. Therefore, there is no need to establish a precise foundation for the track system or to precisely control the elevation of the track along part or all of its length. All that is necessary is to precisely position the relatively short locator blocks at each work station.

With the elevation of the bottom face of the locator blocks precisely determined, the remaining vertical dimensions to be controlled include the position of adjustment screw 56 and the possible use of shims (not illustrated) between bracket 40 and carriage platform 10. Of course, these latter two adjustments, being part of the carriage, are therefore uniform and constant for all work stations. Therefore, vertical variations or discrepancies between work stations must be compensated for by the vertical position of each locator block.

Continuing with the explanation of the establishment of the lateral location of the carriage at the work station and the clamping means, and referring in particular to FIGS. 2-4, lateral locator block 24 cooperates with lateral locator 62 secured to the lower edge of mounting plate 54. Block 24 is provided with a longitudinally extending transversely inclined ramp 64 which is engaged by an identically inclined follower formation 66 on lateral locator 62 as carriage 10 rises during extension of the toggle mechanism. Continued lifting of the carriage causes the carriage to be wedged or cammed laterally by these cooperating inclined faces, until they reach a predetermined lateral and vertical position at the termination of the stroke of the toggle mechanism.

Those skilled in the art will understand that the very slight degree of over-center travel of the toggle mechanism will result in a negligible amount of reduction in the elevation of the carriage from its top dead center position. Therefore, for all practical purposes, the carriage is clamped to locator block 24, which is pinched between pinch block 46 and lateral locator 62. The foregoing explanation completes the explanation of the vertical and lateral position control and the clamping function which occurs at one corner of the carriage. The vertical position control and the clamping action and mechanism is identical at the other three corners.

Figure 6:
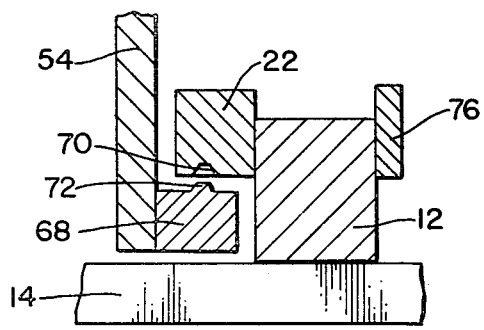
FIG. 6 is a fragmentary longitudinal sectional view, similar to FIG. 3, but showing the locator system which positively locates the carriage in both the longitudinal and transverse directions.

The location-establishing means at the other three corners of carriage platform 10 will now be described. FIG. 6 illustrates a view similar to that of FIG. 3, and shows the positive locating mechanism which establishes both the longitudinal and lateral position of that corner of the carriage. Positive locator block 22 cooperates with positive locator 68 secured to mounting plate 52 by means of similarly shaped conical socket 70 and conical follower formation 72. Thus, lifting of the carriage by the toggle mechanism causes follower 72 to accurately seat itself in socket 70, thus camming or wedging the carriage both laterally and longitudinally into the predetermined position established by precisely located positive locator block 22.

Figure 7:
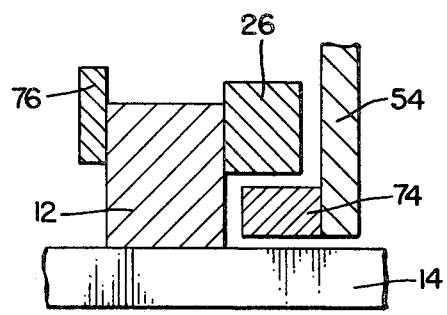
FIG. 7 is a view similar to FIG. 6, showing the locator system for the slave side of the track.

Thus, the lateral and longitudinal position of carriage platform 10 is precisely established at each work station by means of the two locator blocks 22, 24, along the positive side of the track. All that remains is to precisely establish the height of the carriage platform at the slave or opposite side of the track. This function is provided by slave locators 74 secured to mounting plate 52 located on the under side of the slave side of carriage platform 10. As shown in FIG. 7, slave locator 74 comprises a simple rectangular block having a horizontal upper face which engages the horizontal lower face of slave locator blocks 26 at the forward and rearward ends of the slave side of the platform. This formation, coupled with the identically actuated and configured pinch blocks 46 along the slave side of the platform, accurately determines the height of that side of the platform, while permitting sliding lateral and longitudinal movement as necessary during the camming or wedging function of the locating elements on the positive side of the track.

Figure 8:
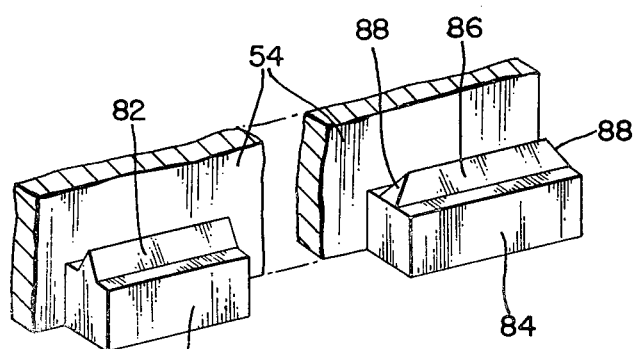
FIG. 8 is a fragmentary perspective view of a modified locator system.

As an alternative to the positive side locators 62 and 68, the configuration of FIG. 8 may be preferred. Lateral locator 80 is provided with an inverted V-shaped ramp formation 82 to provide lateral camming action in both directions as contrasted with the single ramp of formation 66 in FIG. 3. In place of conical locator 72, the positive locator 84 may be identical to lateral locator 80, except that formation 86 has longitudinally sloping ramps 88 at each end to provide longitudinal camming action. Identical female configurations (not illustrated) would be provided in the underside of the associated locator blocks on the positive side. This alternative configuration provides improved bearing surfaces and reduced wear.

The contemplated control mechanism (not illustrated) will now be described. At the completion of the robot's operation at a given work station, the robot generates a task completed signal and a direction to the next station signal. Hydraulic valves are actuated to retract cylinder rods 30 to release the clamps engaging the four locator blocks and lower wheels 16 back onto tracks 12. Four limit switches confirm the completion of this step. Hydraulic motors 20 drive axles 18 and wheels 16 at a predetermined maximum acceleration until a track-mounted trip engages a carriage-mounted limit switch to initiate deceleration and then creep of the carriage as described above. After extension of the toggle mechanism and clamping is signaled by limit switches, the robot is signaled to operate, and the cycle is complete.

To maintain carriage wheel 16 in proper position and alignment on tracks 12 as the carriage travels along the track, outer and inner guides 76, 78 are secured to the edges of the tracks. Additional lateral guiding of the moving carriage may be provided by a grooved roller (not illustrated) rotatably mounted to the underside of the carriage on a transverse horizontal axis, the roller having a circumferential groove which engages the upstanding leg of a fixed angle iron or inverted T-bar extending longitudinally between the tracks and secured to cross ties 14. Alternatively, steering rollers (not illustrated) may be mounted at each corner of the carriage. These may be simple idler wheels which rotate about a vertical axis and are positioned to roll along the inner face of guides 76, with appropriate tolerances to permit lateral shifting of the carriage at the work stations.

While the toggle mechanism has been illustrated and described as being located on the opposite side of mounting plate 54 from pinch blocks 46, it is contemplated that such elements may alternatively be mounted on the same side of such mounting plate, to reduce the bending moments created by the lateral offset of connector 32 from block 46 as viewed in FIG. 3. In such an arrangement, dovetail guide block 48 may be replaced by a simple vertical guide slot in mounting plate 54 for guiding lower toggle pin 44 in a vertical path.

Simple and effective full length fixed track guards can be mounted to guides 76 from which they extend upwardly and then turn at a right angle to extend horizontally into the vertical gap between the bottom of carriage 10 and the upper limit of travel of the top of wheels 16.

All of the lifting and clamping mechanism, as well as the locator formations, are well protected from dirt, debris or damage by their position beneath the overhang of the carriage platform.

While drive wheel motors 20 have been described as hydraulic, it is contemplated that one or two electric motors could be alternatively used. In the latter event, toggle actuator cylinders 28 would preferably be pneumatic. Furthermore, it may be preferable to utilize individual cylinders for each of the four toggle mechanisms, to permit the sequencing of their actuation to be varied.

As an alternative to the use of the locator blocks for establishing the final longitudinal position of the carriage, it is contemplated that a digital read-out device could be employed to send a continuous position-responsive signal to the control means which forms a portion of the robot control device (not illustrated). Such signal could, for example, be generated by a carriage-mounted pinion gear which engages a fixed rack gear extending longitudinally along the supporting track structure.

In applications where the robot performs its function while traveling along the track (e.g., in a painting operation), there is no need to provide a longitudinal positioning means or a firm clamping action. Instead, the toggle mechanism would cause the pinch block to lift the still-moving carriage as described above, and the locator elements would rise and slidably engage the formations in the underside of the locator blocks to establish the desired lateral positioning. The locator blocks would necessarily be elongated to coincide with the longitudinal distance to be traversed by the carriage while in the operating mode. The rail-clamping action would be at least partially reduced, so that the carriage could continue to be propelled against a relatively light clamping force. This reduced clamping force may be readily provided by advancing the position of stop screw 56 (FIG. 2) to terminate the stroke of cylinder rod 30 slightly before it reaches the top dead center position of the toggle mechanism. The longitudinal position-establishing portion of the female formation in the locator blocks would be eliminated for such elongated work stations.

This invention may be further developed within the scope of the following claims. Accordingly, the above specification is to be interpreted as illustrative of only a few operative embodiments of the present invention, rather than in a strictly limited sense.

I now claim:

1. In a transporter system for guiding and conveying a load along a predetermined path, a platform on which the load is precisely located and mounted, the platform having a plurality of platform-supporting wheels which roll along a pair of laterally spaced path-defining tracks, the position and dimensions of the tracks lacking the precision necessary to assure the desired accuracy of location of the load when it arrives at a predetermined station along the path, the improvement which comprises:

platform lifting means mounted on the platform and adapted to lift the platform off the tracks after the platform has been approximately prepositioned at a predetermined station;

locator block means precisely dimensioned and fixedly positioned at said station to the desired degree of accuracy, said locator block means having an underside with a downwardly facing surface which is engageable by an upwardly facing surface fixedly secured to and positioned beneath said platform, said engageable surfaces being precisely located and dimensioned whereby upward travel of said platform during platform lifting causes said surfaces to abut and firmly seat against each other when said platform has reached a precise predetermined elevation;

said engageable surfaces including cooperating inclined ramp-like formations which initially engage each other only after said platform has been lifted off the tracks during upward movement of said platform, said ramp-like formations camming said platform in a horizontal direction relative to the tracks as said platform rises, to eliminate any undesired inaccuracy in the horizontal pre-position of said platform prior to said platform reaching its predetermined elevation.

2. The transporter system of claim 1 wherein said lifting means includes a toggle mechanism comprising a pair of toggle links extending generally upwardly and downwardly, respectively, from a common central pivot axis, said upwardly extending link being pivotally connected at its upper end to the platform for vertical movement therewith, said downwardly extending link being pivotally connected at its lower end to a lifting block which is slidably mounted on said platform for movement in a vertical direction relative thereto, said lifting block having a downwardly facing surface which is engageable with an upwardly facing surface on said locator block means;

whereby actuation of said lifting means causes said downwardly extending link to slide said lifting block downwardly relative to the platform until it engages said fixed locator block means, whereupon continued movement of said toggle links toward their vertically aligned and fully extended position causes the platform to be lifted off the tracks;

the engagement of said locator block means between said lifting block and said upwardly facing surface of said platform, when said platform reaches its predetermined elevation, causing said platform to be securely clamped to said locator block means in its final predetermined position.

3. The transporter system of claim 1 wherein said locator block means at said station includes at least three horizontally spaced locator blocks, all of said locator blocks having said platform elevation-establishing surfaces, each of said locator block means having a top surface which is engageable by said lifting means to provide a reactor surface against which said lifting means bears during lifting, the engagement of said locator blocks between said lifting means and said upwardly facing surfaces of said platform, when said platform reaches its predetermined elevation, causing said platform to be securely clamped to each of said locator blocks in its final predetermined position.

4. In a transporter system for guiding and conveying a load along a predetermined path, a platform on which the load is precisely located and mounted, the platform having a plurality of platform-supporting wheels which roll along a pair of laterally spaced path-defining tracks, the position and dimensions of the tracks lacking the precision necessary to assure the desired accuracy of location of the load when it arrives at a predetermined station along the path, the improved method of precisely locating and securing the platform after the platform has been approximately pre-positioned at a predetermined station comprising:

lifting the platform off the tracks by platform-mounted lifting means;

horizontally re-positioning the platform to its precise desired horizontal location during upward movement of the platform by fixedly and precisely positioning at the predetermined station a locator means having a camming surface which is engaged by an upwardly moving follower surface on the platform as the platform is raised by said lifting means;

vertically positioning the platform at its precise desired elevation by the complete seating of said engageable camming and follower surfaces against each other at the conclusion of the upward travel of the platform;

whereby the raising of the platform to bring said engageable camming and follower surfaces into butting contact establishes a precise predetermined horizontal and elevational location for the platform; and firmly clamping the platform in its desired position by gripping said locator means between said lifting means and said follower surface.

* * * * *